United States Patent
Zewail et al.

(10) Patent No.: US 12,279,246 B2
(45) Date of Patent: Apr. 15, 2025

(54) MODULATION AND CODING SCHEME CAPABILITY FOR HIGH BAND WIRELESS COMMUNICATION

(71) Applicant: QUALCOMM Incorporated, San Diego, CA (US)

(72) Inventors: Ahmed Abdelaziz Ibrahim Abdelaziz Zewail, San Diego, CA (US); Zhifei Fan, San Diego, CA (US); Jing Sun, San Diego, CA (US); Xiaoxia Zhang, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 17/646,985

(22) Filed: Jan. 4, 2022

(65) Prior Publication Data

US 2022/0225346 A1    Jul. 14, 2022

Related U.S. Application Data

(60) Provisional application No. 63/137,656, filed on Jan. 14, 2021.

(51) Int. Cl.
*H04W 72/04* (2023.01)
*H04L 5/00* (2006.01)
(Continued)

(52) U.S. Cl.
CPC ........... *H04W 72/12* (2013.01); *H04L 5/0048* (2013.01); *H04L 5/0055* (2013.01); *H04W 8/24* (2013.01); *H04W 24/08* (2013.01)

(58) Field of Classification Search
CPC ..... H04W 72/12; H04W 72/541; H04W 8/24; H04W 24/08; H04W 24/02; H04W 88/02;
(Continued)

(56) References Cited

U.S. PATENT DOCUMENTS

2017/0111887 A1* 4/2017 Hong ................ H04L 5/0035
2018/0270707 A1* 9/2018 Seo ................... H04W 28/06
(Continued)

OTHER PUBLICATIONS

Apple Inc: "A Discussion on Physical Layer Design for NR between 52.6GHz and 71GHz",3GPP Draft, RI-2008457, 3GPP TSG RAN WG1 #103-e, 3GPP, vol. RAN WG1, No. e-Meeting, Oct. 26, 2020-Nov. 13, 2020, Oct. 17, 2020 (Oct. 17, 2020), XP051940157, 32 Pages, Retrieved from the Internet: URL:https://ftp.3gpp.org/tsg_ran/WG1_RL1/TSGRI_103-e/Docs/RI-2008457.zip RI-2008457, A Discussion on Physical Layer Design for NR between 52.6GHz and 71 GHz.docx [retrieved on Oct. 17, 2020] sections 4, 6.
(Continued)

*Primary Examiner* — Mahbubul Bar Chowdhury
(74) *Attorney, Agent, or Firm* — Procopio, Cory, Hargreaves & Savitch

(57) ABSTRACT

Aspects presented herein may enable a UE to limit MCS and/or K1 offset used for communicating with a base station to a threshold based at least in part on an SCS used for the communication. In one aspect, a UE limit at least one of an MCS to being less than or equal to an MCS threshold or a K1 offset to being greater than or equal to a K1 offset threshold based on a subcarrier spacing selected for communication with a base station, the K1 offset being a number of slots between receiving DL data and transmitting ACK/NACK feedback. The UE communicate with the base station based at least on one of the MCS being less than or equal to the MCS threshold or the K1 offset being greater than or equal to the K1 offset threshold.

24 Claims, 12 Drawing Sheets

(51) Int. Cl.
*H04W 8/24* (2009.01)
*H04W 24/08* (2009.01)
*H04W 72/12* (2023.01)

(58) Field of Classification Search
CPC ... H04L 5/0048; H04L 5/0055; H04L 1/1864; H04L 1/1896; H04L 1/0003; H04L 1/0009; H04L 1/0015; H04L 1/1825; H04L 1/1854
See application file for complete search history.

(56) References Cited

U.S. PATENT DOCUMENTS

| | | | |
|---|---|---|---|
| 2019/0159257 A1* | 5/2019 | Rico Alvarino | H04W 74/0833 |
| 2020/0021412 A1* | 1/2020 | Xu | H04L 27/261 |
| 2020/0022172 A1* | 1/2020 | Sun | H04L 5/0082 |
| 2020/0052944 A1* | 2/2020 | Zhang | H04L 5/0007 |
| 2020/0067628 A1* | 2/2020 | Xu | H04L 1/0004 |
| 2020/0076647 A1* | 3/2020 | Zhang | H04L 1/0003 |
| 2020/0092032 A1* | 3/2020 | Zhang | H04W 72/23 |
| 2023/0283429 A1* | 9/2023 | Park | H04L 1/1854 370/329 |

OTHER PUBLICATIONS

Huawei, et al:, "Further Details of PTRS", 3GPP Draft, R1-1717306, 3GPP TSG RAN WG1 Meeting #90bis, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Oct. 9, 2017-Oct. 13, 2017, Oct. 2, 2017 (Oct. 2, 2017), XP051352218, 13 Pages, Retrieved from the Internet: URL: http://www.3gpp.org/ftp/tsg_ran/WG1_RL1/TSGR1_90b/Docs/ [retrieved on Oct. 2, 2017] the whole document.
Partial International Search Report—PCT/US2022/011327—ISA/EPO—May 9, 2022.
International Search Report and Written Opinion—PCT/US2022/011327—ISA/EPO—Jun. 30, 2022.

* cited by examiner

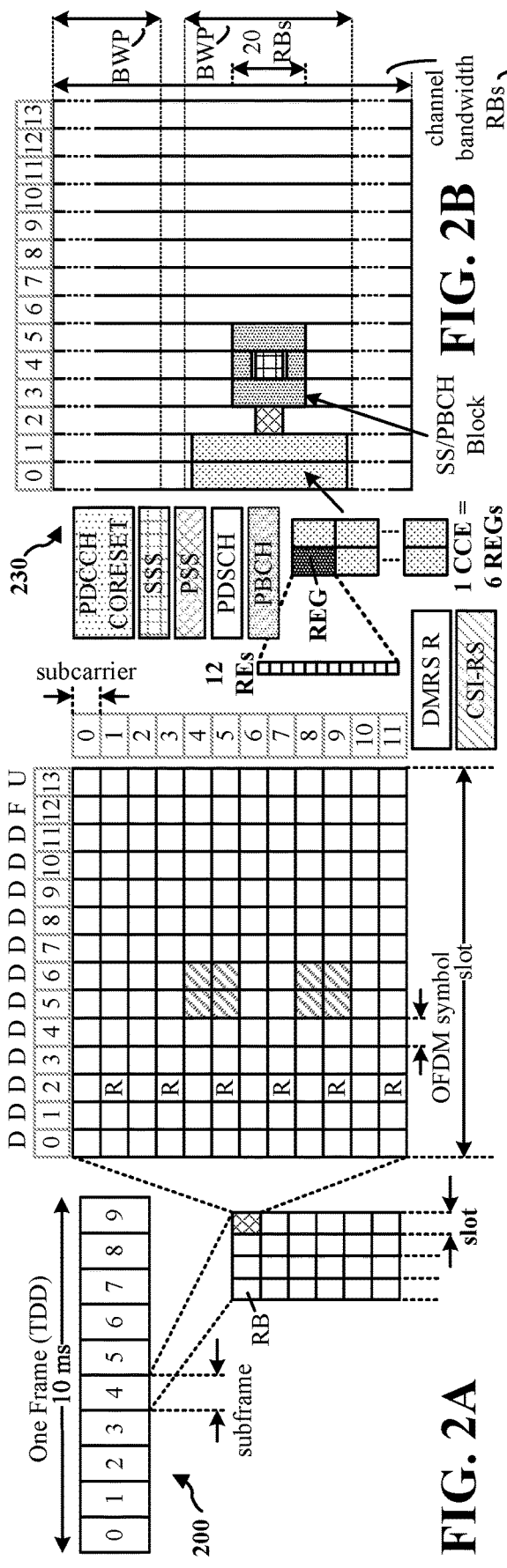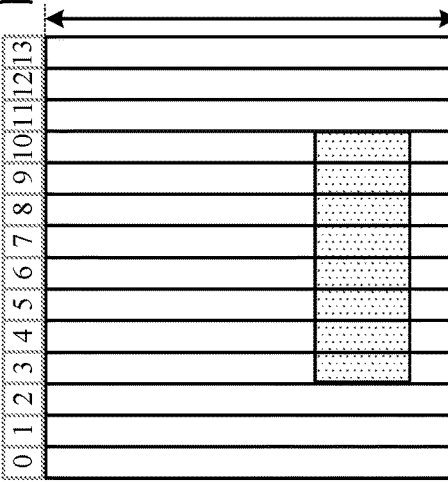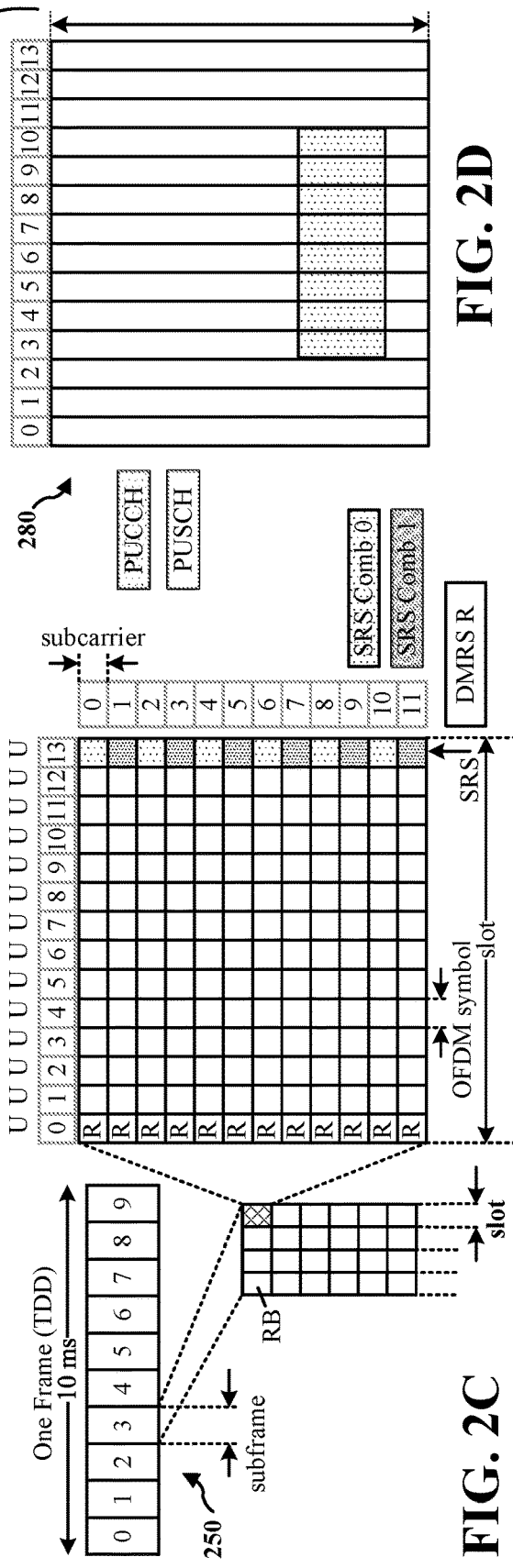
FIG. 2A  FIG. 2B  FIG. 2C  FIG. 2D

MODULATION AND CODING SCHEME CAPABILITY FOR HIGH BAND WIRELESS COMMUNICATION

CROSS REFERENCE TO RELATED APPLICATION(S)

This application claims the benefit of and priority to U.S. Provisional Application Ser. No. 63/137,656, entitled "MODULATION AND CODING SCHEME CAPABILITY FOR HIGH BAND WIRELESS COMMUNICATION" and filed on Jan. 14, 2021, which is expressly incorporated by reference herein in its entirety.

TECHNICAL FIELD

The present disclosure relates generally to communication systems, and more particularly, to wireless communication involving modulation and coding scheme (MCS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus limits at least one of an MCS to being less than or equal to an MCS threshold or a K1 offset to being greater than or equal to a K1 offset threshold based on a subcarrier spacing selected for communication with a base station, the K1 offset being a number of slots between receiving DL data and transmitting ACK/NACK feedback. The apparatus communicates with the base station based at least on one of the MCS being less than or equal to the MCS threshold or the K1 offset being greater than or equal to the K1 offset threshold.

In an aspect of the disclosure, a method, a computer-readable medium, and an apparatus are provided. The apparatus receives, from a user equipment (UE), a capability message indicating an MCS or a minimum K1 offset that the UE can support, the maximum MCS or the minimum K1 offset being based on a subcarrier spacing. The apparatus communicates with the UE based at least on one of an MCS less than or equal to the maximum MCS or a K1 offset greater than or equal to the minimum K1 offset.

In an aspect of the disclosure, a method, a computer-readable medium, and an apparatus are provided for wireless communication of a UE. The apparatus determines a subcarrier spacing for communication with a base station. The apparatus determines to limit at least one of an MCS to less than or equal to an MCS threshold or a K1 offset to greater than or equal to a K1 offset threshold based on the determined subcarrier spacing, where the K1 offset is a number of slots between receiving downlink (DL) data and transmitting ACK/NACK feedback. The apparatus communicates with the base station based at least on one of an MCS less than or equal to the determined MCS threshold or a K1 offset greater than or equal to the K1 offset threshold.

In an aspect of the disclosure, a method, a computer-readable medium, and an apparatus are provided for wireless communication of a base station. The apparatus receives, from a UE, a capability message indicating a maximum MCS or a minimum K1 offset that the UE can support, the maximum MCS or the minimum K1 offset being based on a subcarrier spacing. The apparatus communicates with the UE based at least on one of an MCS less than or equal to the maximum MCS or a K1 offset greater than or equal to the minimum K1 offset.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
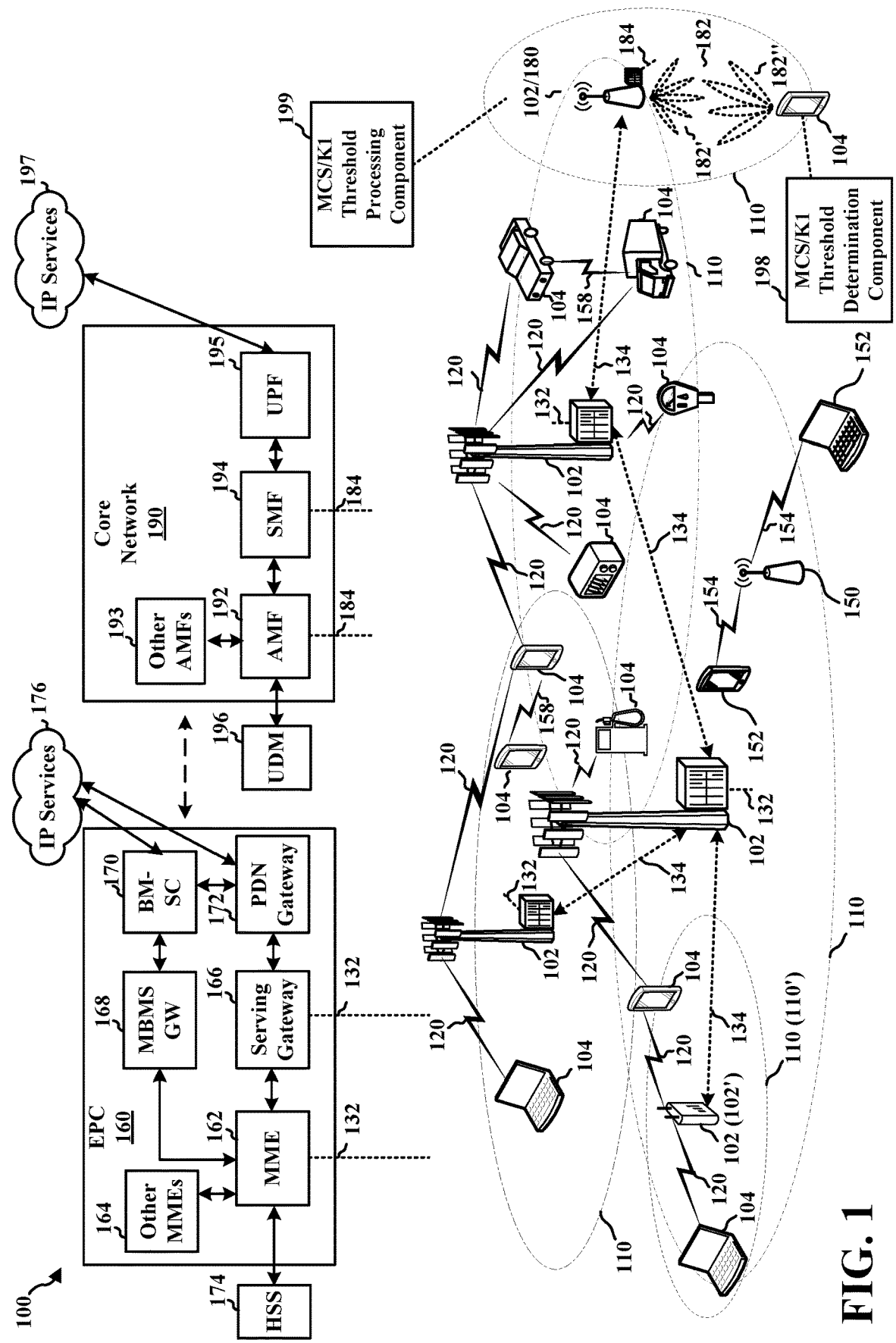
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the UE 104 may include an MCS/K1 threshold determination component 198 configured to limit MCS and/or K1 offset used for communicating with a base station to a threshold based at least in part on an SCS used for the communication. In one configuration, the MCS/K1 threshold determination component 198 may be configured to determine a subcarrier spacing for communication with a base station. In such configuration, the MCS/K1 threshold determination component 198 may determine to limit at least one of an MCS to less than or equal to an MCS threshold or a K1 offset to greater than or equal to a K1 offset threshold based on the determined subcarrier spacing, where the K1 offset is a number of slots between receiving DL data and transmitting acknowledgment ACK/NACK feedback. In such configuration, the MCS/K1 threshold determination component 198 may communicate with the base station based at least on one of an MCS less than or equal to the determined MCS threshold or a K1 offset greater than or equal to the K1 offset threshold.

In certain aspects, the base station 102/180 may include an MCS/K1 threshold processing component 199 configured to communicate with a UE (e.g., the UE 104) based on an MCS and/or a K1 offset indicated by the UE. In one configuration, the MCS/K1 threshold processing component 199 may be configured to receive, from a UE, a capability message indicating a maximum MCS or a minimum K1 offset that the UE can support, the maximum MCS or the minimum K1 offset being based on a subcarrier spacing. In such configuration, the MCS/K1 threshold processing component 199 may communicate with the UE based at least on one of an MCS less than or equal to the maximum MCS or a K1 offset greater than or equal to the minimum K1 offset.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
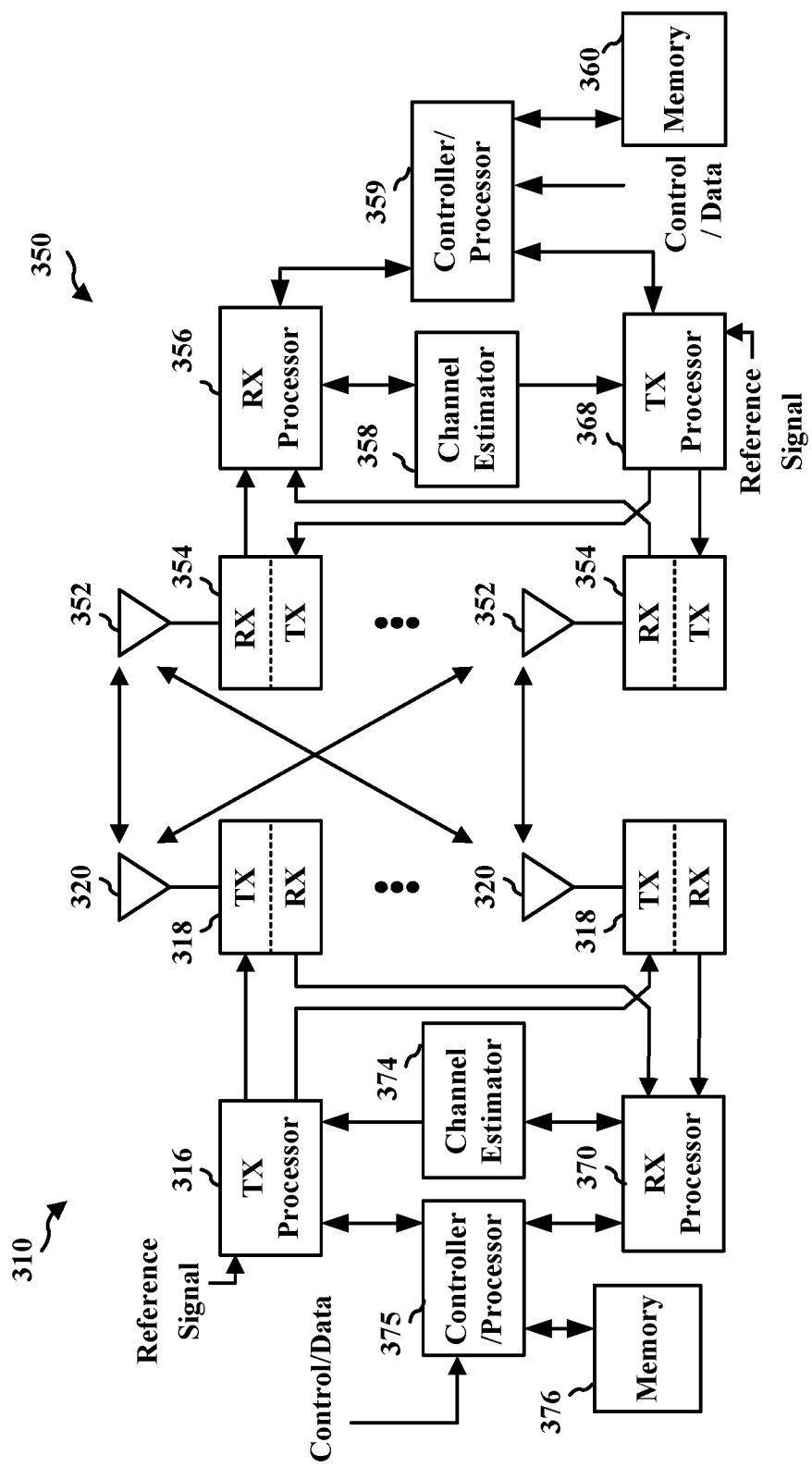
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the MCS/K1 threshold determination component 198 of FIG. 1.

At least one of the TX processor 316, the RX processor 370, and the controller/processor 375 may be configured to perform aspects in connection with the MCS/K1 threshold processing component 199 of FIG. 1.

As wireless technology continues to grow, higher frequency bands above FR2 (e.g., 24.25 GHz-52.6 GHz) may be used, including the bands between 52.6 GHz-71 GHz and sub-Terahertz (sub-THz) bands above 140 GHz or between 300 GHz and 3 THz, etc. Higher frequency radio technology, such as the sub-THz frequency range, may enable much narrower beam structures compared to the beam structures under FR2 or below because more radiating elements may be placed per given area at the antenna due to smaller wavelength. The higher frequency band may have a short delay spread (e.g., few nanoseconds) and may be translated into a coherence frequency bandwidth of tens of MHz. As such, a higher operating frequency band may enable a UE to communicate with a base station or with another UE using larger bandwidths with higher throughput. However, transmissions between wireless devices using a larger bandwidth and/or at a higher operating frequency may encounter higher phase noise due to the mismatch of frequency oscillators between a transmitting wireless device and a receiving wireless device. The phase noise impact between the wireless devices may become more severe as the carrier frequency increases, which may cause common phase error (CPE) and/or inter-carrier interference (ICI). CPE may lead to an identical rotation of a received symbol in each subcarrier, whereas ICI may lead to a loss of orthogonality between the subcarriers.

To combat or reduce the impact resulting from the phase noise, such as the CPE and/or the ICI, wireless devices may use phase tracking reference signal (PT-RS) to track the phase and mitigate the performance loss due to phase noise. For example, a receiving wireless device may estimate the CPE and/or the ICI of a transmission based on the PT-RS transmitted from a transmitting wireless device, and the receiving wireless device may perform CPE compensation and/or ICI compensation for the transmission based on the estimated CPE and/or ICI. In other examples, to combat the phase noise, the subcarrier spacing (SCS) of OFDM symbols used by the wireless devices may be increased (e.g., to 960 kHz, 1920 kHz, 3840 kHz, etc.). For example, with a larger SCS, it may be easier for wireless devices to estimate and compensate the phase noise. Also, the CPE compensation may not be computationally expensive compared with the ICI compensation. In some examples, for communications at higher frequency bands (e.g., 52.6 GHz-71 GHz or above), a receiving wireless device may apply CPE compensations for transmissions involving large SCSs, e.g., 960 KHz, to achieve sufficiently reasonable performance without applying ICI compensation. However, for transmissions involving smaller SCSs, e.g., 120 KHz, the receiving wireless device may be configured to also apply ICI compensation in order to achieve a comparable performance.

In some examples, the radio frequency (RF) module at a UE may be the main contributor to the phase noise, and the quality of the RF module may differ from one UE to another. For example, for a UE with a higher quality RF module (e.g., RF module with higher capability/performance), it may be sufficient for the UE to apply CPE compensation for communications using most modulation and coding scheme (MCS) values without applying ICI compensation. On the other hand, for a UE with a lower quality RF module (e.g., RF module with lower capability/performance), the UE may be configured to apply ICI compensation for communications using some of the MCS values in order to achieve a comparable performance, such as for communications using 64 quadrature amplitude modulation (QAM) MCSs. In addition to the RF module quality, the processing capability of the UE may also limit the UE's ability for the phase noise compensation. For example, a UE's processing capability may enable a UE to perform the CPE compensation but not the ICI compensation, or the UE may perform the ICI compensation with a limited number of filter taps, which may not be sufficient for high MCSs.

Aspects presented herein may enable to a UE to communicate with a base station using an MCS that is determined based at least in part on the SCS associated with the communication. Aspects presented herein may enable a UE to limit the MCS used for communicating with a base station to an MCS threshold when the SCS used for communicating with the base station is below an SCS threshold (e.g., if SCS<SCS threshold, MCS<MCS threshold). For example, if a UE is communicating with a base station at a higher band (e.g., 52.6 GHz-71 GHz), the UE may limit the MCS to 16 QAM MCSs or below when the SCS is 120 KHz or below. An MCS table may be defined or modified for the UE based on the SCS and/or the UE's capability, such that the UE may determine whether to limit the MCS and/or the MCS threshold value based on the MCS table. As such, aspects presented herein may enable a UE to limit the throughput that could be achieved by the UE to reduce or avoid the ICI, or when the ICI is above an ICI threshold.

Figure 4:
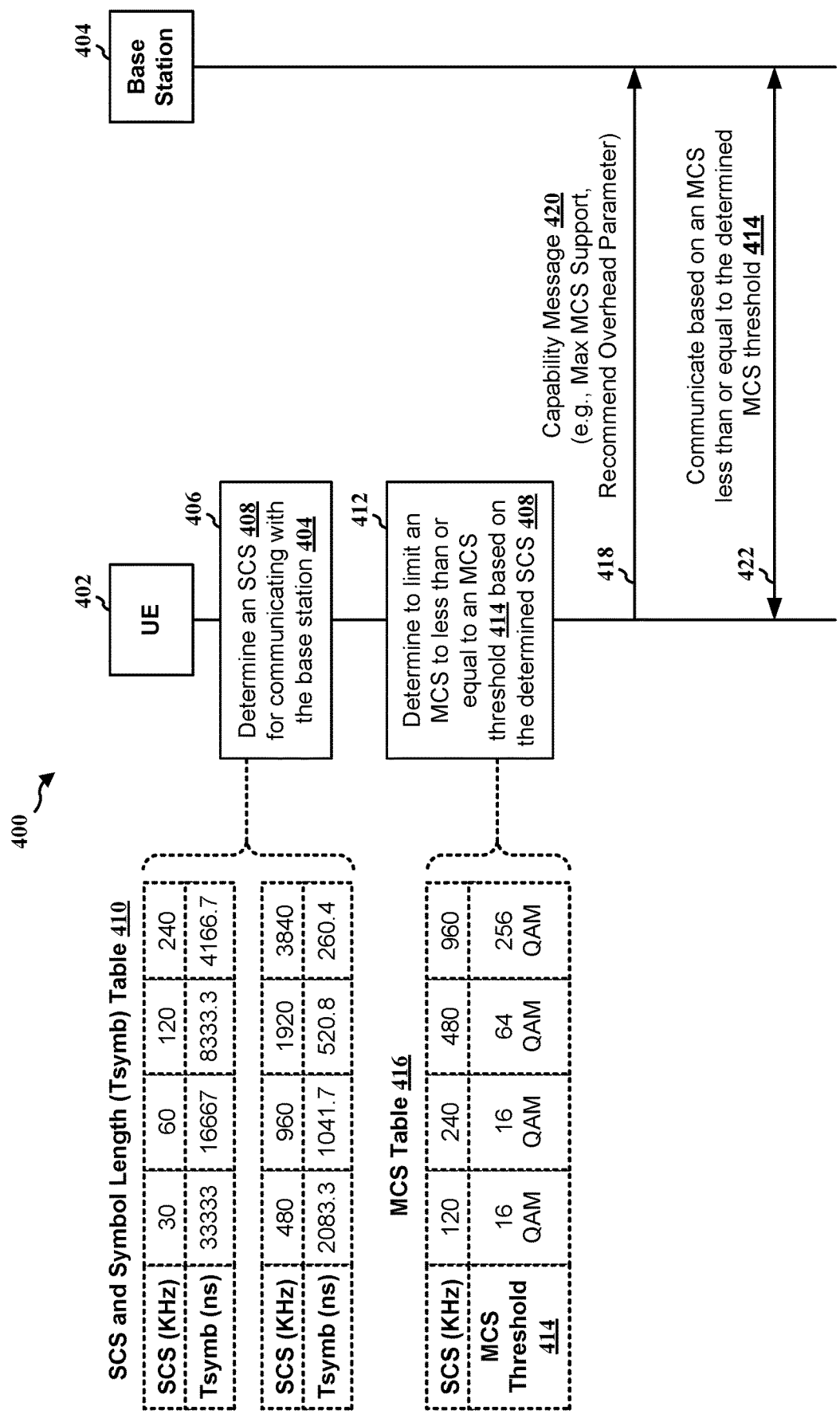
FIG. 4 is a communication flow illustrating an example of limiting an MCS of a communication between a UE and a base station based on SCS according to aspects of the present disclosure.

FIG. 4 is a communication flow 400 illustrating an example of limiting an MCS of a communication between a UE and a base station based on SCS according to aspects of the present disclosure. As shown by the communication flow 400, at 406, a UE 402 may determine an SCS 408 that is to be used for communicating with a base station 404. The length of an OFDM symbol used for the communication may be inversely proportional to the size of the SCS 408 (e.g., OFDM symbol length=1/SCS), such that the length of the OFDM symbol may decrease as the SCS increases. For example, as shown by a Table 410 illustrating examples of OFDM symbol lengths (e.g., Tsymb) for different SCSs, an OFDM symbol with an SCS of 30 KHz may have a symbol length of 33333 nanoseconds (ns), an OFDM symbol with an SCS of 120 KHz may have a symbol length of 8333.3 ns, and an OFDM symbol with an SCS of 960 KHz may have a symbol length of 1041.7 ns, etc.

At 412, the UE 402 may determine to limit an MCS (e.g., MCS used for communicating with the base station 404) to less than or equal to an MCS threshold 414, where the MCS threshold 414 may be determined based at least in part on the determined SCS 408. For example, an MCS Table 416 may be defined (or modified from an existing table) for the UE 402, which may indicate or specify the MCS threshold 414 the UE 402 may use for different SCSs. For example, at certain frequency band (e.g., 52.6-71 GHz), if the UE 402 chooses 120 KHz for the SCS 408, the MCS Table 416 may indicate that 16 QAM modulation scheme or below may be used for the communication, and if the UE 402 chooses 960 KHz for the SCS 408, the MCS Table 416 may indicate that 256 QAM modulation scheme or below may be used for the communication, etc. In some examples, the modulation schemes may include at least one of π/2-BPSK, QPSK, 16 QAM, 64 QAM, and/or 256 QAM, etc.

In one example, the UE 402 may determine whether to limit the MCS to less than or equal to the MCS threshold 414 based at least in part on whether ICI is detected and/or level of the ICI. For example, the UE 402 may measure the ICI for the communication between the UE 402 and the base station 404. Then, the UE 402 may determine to limit the MCS to less than the MCS threshold 414 if the UE 402 determines that the ICI is greater than an ICI threshold.

At 418, the UE 402 may transmit a capability message 420 to the base station 404, where the capability message 420 may indicate a maximum MCS (e.g., the MCS threshold 414) that the UE 402 may support. In some examples, the capability message 420 may further indicate an overhead parameter that may be associated with the indicated MCS (e.g., the MCS threshold 414). For example, the UE 402 may recommend an overhead parameter value to the base station 404, where the overhead parameter may be used by the base station 404 for determining the size of a transport block (TB) used for the communication and/or for scheduling the communication. In some examples, the overhead parameter may be selected from one of the set {0, 6, 12, 18}. In other examples, the UE 402 may determine the overhead parameter based on a PT-RS density, where the PT-RS density may be determined based on PT-RS received from the base station 404. For example, an overhead parameter may be assigned for or associated with a PT-RS density or a subset/range of PT-RS densities. Alternatively, or additionally, the overhead parameter may also be a function of the determined/used MCS (e.g., the MCS threshold 414) and/or a physical resource block (PRB) allocation associated with the communication.

In other words, a UE may send, to a base station, a capability message that may indicate a maximum MCS the UE may support, and a recommendation for the overhead parameter that may be used for a TB calculation. Then, the base station may schedule the UE based on this recommendation. In some examples, the UE's capability to limit/reduce MCS may be a function of the SCS, such that the MCS used by the UE may be SCS dependent. In some examples, the recommendation of the overhead parameter may be tied to the PT-RS density, i.e., assign different value for each PT-RS density. In other examples, the recommendation of the overhead parameter may be a function of the used MCS and/or PRB allocation. The disclosed MCS threshold (e.g., 414) may be different from an MCS cap/limit for a UE with a reduced/lower capability (e.g., a reduced capability (RedCap) UE) as the MCS threshold may be SCS dependent.

At 422, after the UE 402 determines the SCS 408 and/or the MCS threshold 414, the UE 402 may communicate with the base station 404 based at least on an MCS less than or equal to the determined MCS threshold 414. For example, if the UE 402 indicates to the base station 404 (e.g., via the capability message 420) that it may support a modulation scheme of up to 16 QAM, the UE 402 may communicate with the base station 404 based on an MCS that is equal to or less than 16 QAM (e.g., 16 QAM, QPSK, etc.).

Figure 5:
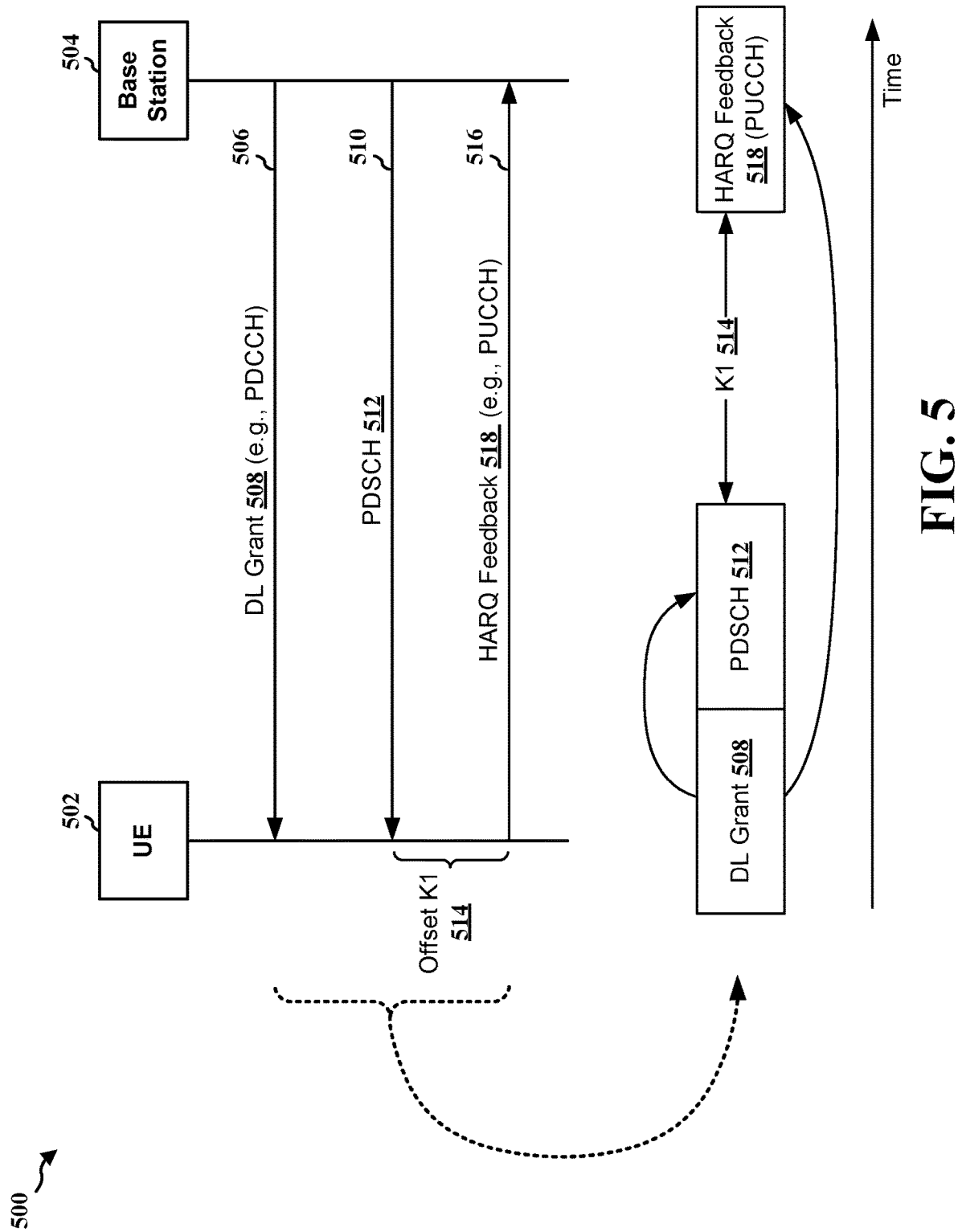
FIG. 5 is a communication flow illustrating an example of a HARQ feedback procedure.

A UE may use HARQ feedback (e.g., an acknowledgment (ACK) or negative ACK (NACK) (ACK/NACK)) to indicate the decoding result of a received PDSCH to a base station. FIG. 5 is a communication flow 500 illustrating an example of a HARQ feedback procedure. At 506, a base station 504 may transmit a DL grant 508 (e.g., in a DCI of a PDCCH) to a UE 502, where the DL grant 508 may schedule a resource for the UE 502 to receive a PDSCH 512. The DL grant 508 may request the UE 502 to provide a HARQ feedback for the PDSCH 512, and the DL grant 508 may also include an offset K1 514 (e.g., a feedback gap indicator) that may correspond to a time gap between the UE 502's reception of the PDSCH 512 and the time in which the UE 502 is expected to transmit a corresponding HARQ feedback for the PDSCH 512, such as via a PUCCH message. At 510, the UE 502 may receive the scheduled PDSCH 512 from the base station 504. Based on the decoding result of the PDSCH 512, at 516, the UE 502 may transmit a HARQ feedback 518 to the base station 504 indicating whether the PDSCH 512 has been successfully decoded, where the HARQ feedback 518 may be transmitted in a PUCCH. For example, if the UE 502 successfully decodes the PDSCH 512, at 510, the UE 502 may transmit a positive HARQ feedback (e.g., ACK) to the base station 504. On the other hand, if the UE 502 is unable to decode the PDSCH 512, such as not receiving the PDSCH or the decoding fails, at 510, the UE 502 may transmit a negative HARQ feedback (e.g., NACK) to the base station 504.

In another aspect of the present disclosure, a K1 offset (e.g., a new K1 offset or a modified K1 offset) may be defined for MCS (e.g., higher MCS) that involves ICI compensation, whereas MCS that does not involve ICI compensation may use another K1 offset (e.g., an original K1 offset or an unmodified K1 offset). As such, the K1 offset value may be configured to be SCS dependent, which may reduce the burden of the processing complexity associated with the ICI compensation for a UE.

Figure 6:
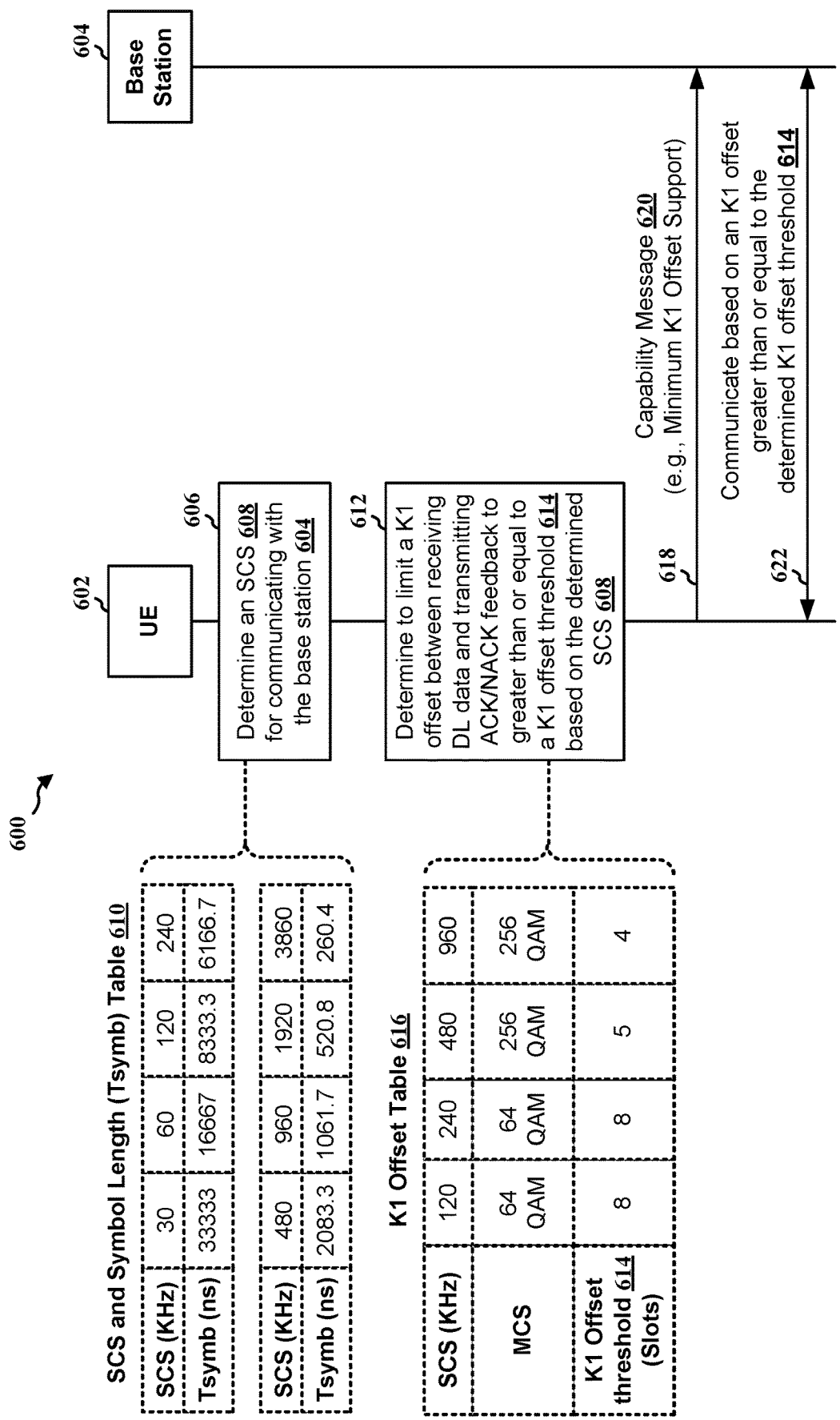
FIG. 6 is a communication flow illustrating an example of limiting a K1 offset of a communication between a UE and a base station based on SCS or MCS associated with the SCS according to aspects of the present disclosure.

FIG. 6 is a communication flow 600 illustrating an example of limiting a K1 offset of a communication between a UE and a base station based on SCS or MCS associated with the SCS according to aspects of the present disclosure. As shown by the communication flow 600, at 606, a UE 602 may determine an SCS 608 that is to be used for communicating with a base station 604. The length of an OFDM symbol may be inversely proportional to the size of the SCS (e.g., OFDM symbol length=1/SCS), such that the length of an OFDM symbol may decrease as the SCS increases. For example, as shown by a Table 610 illustrating examples of OFDM symbol lengths (e.g., Tsymb) for different SCSs.

At 612, the UE 602 may determine to limit a K1 offset between receiving DL data and transmitting ACK/NACK feedback to greater than or equal to a K1 offset threshold 614, where the K1 offset threshold 614 may be determined based at least in part on the determined SCS 608. For example, a K1 offset Table 616 may be defined (or modified from an existing table) for the UE 602, which may indicate or specify the K1 offset threshold 614 the UE 602 may use for different SCSs and/or MCSs. The value for the K1 offset threshold 614 may be determined based at least in part on whether ICI compensation is involved for the corresponding SCS and/or MCS. For example, if the UE 602 chooses 120 KHz for the SCS 608 which uses 64 QAM MCS and involves ICI compensation, the K1 offset Table 616 may indicate that the minimum value for the K1 offset threshold 614 is eight (8) slots. On the other hand, if the SCS 608 selected by the UE 602 does not involve ICI compensation, then the UE 602 may apply another K1 offset threshold 614. For example, if the UE 602 chooses 960 KHz for the SCS 608 which uses 256 QAM MCS and does not involve ICI compensation, the K1 offset Table 616 may indicate that the minimum value for the K1 offset threshold 614 is four (4) slots.

In one example, the UE 602 may determine whether to limit the KI offset to greater than or equal to the K1 offset threshold 614 based at least in part on whether ICI is detected and/or level of the ICI. For example, the UE 602 may measure the ICI for the communication between the UE 602 and the base station 604. Then, the UE 602 may determine to limit the K1 offset to greater than the K1 offset threshold 614 if the UE 602 determines that the ICI is greater than an ICI threshold.

At 618, the UE 602 may transmit a capability message 620 to the base station 604, where the capability message 620 may indicate a minimum K1 offset (e.g., the K1 offset threshold 614) that the UE 602 may support. In some examples, the capability message 620 may further indicate an overhead parameter associated with the MCS. For example, the UE 602 may recommend an overhead parameter value to the base station 604, where the overhead parameter may be used by the base station 604 for determining the size of transport block (TB) used for the communication and/or for scheduling the communication. In some examples, the overhead parameter may be selected from one of the set {0, 6, 12, 18}. In other examples, the UE 602 may determine the overhead parameter based on a PT-RS density, where the PT-RS density may be determined based on PT-RS received from the base station 604. For example, an overhead parameter may be assigned for or associated with a PT-RS density or a subset/range of PT-RS densities.

In other words, a new timeline/offset K1' for MCS that involves ICI compensation, e.g., high MCS (e.g., 64 or 256 QAM) that is used with low SCS (e.g., 120 KHz), may be defined for the UE that is more relaxed (e.g., longer) compared with the SCS and/or MCS that does not involve ICI compensation, where MCSs that do not involve ICI compensation may use a different offset K1 (e.g., a shorter offset K1 or the original offset K1). Thus, the offset K1 may be SCS dependent, which may reduce the burden of the processing complexity for the UE.

At 622, after the UE 602 determines the SCS 608 and/or the K1 offset threshold 614, the UE 602 may communicate with the base station 604 based at least on a K1 offset greater than or equal to the determined K1 offset threshold 614. For example, if the UE 602 indicates to the base station 604 (e.g., via the capability message 620) that it may support a minimum K1 offset threshold of eight (8) slots, the base station 604 may schedule an offset K1 (e.g., 514) that is equal to or greater than eight slots (e.g., K1≥8 slots) for the UE 602.

Figure 7:
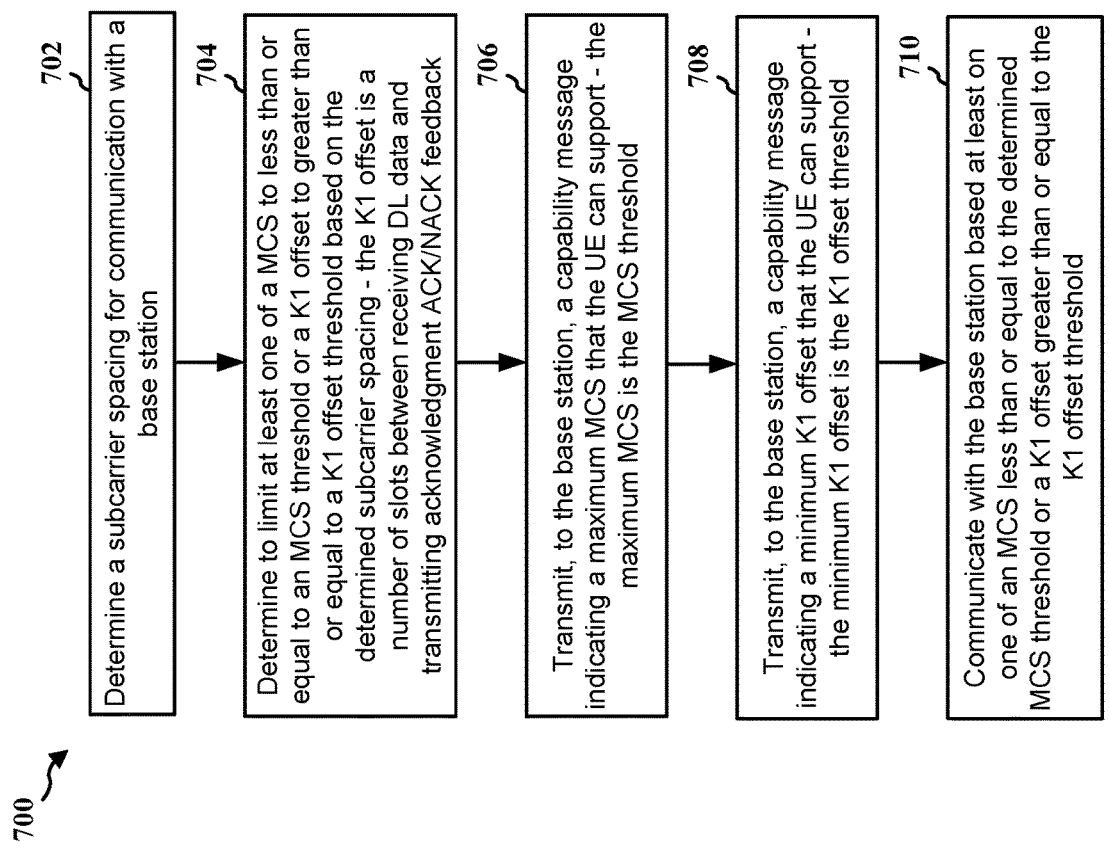
FIG. 7 is a flowchart of a method of wireless communication in accordance with aspects presented herein.

FIG. 7 is a flowchart 700 of a method of wireless communication. The method may be performed by a UE or a component of a UE (e.g., the UE 104, 350, 402, 502, 602; the apparatus 702; a processing system, which may include the memory 360 and which may be the entire UE 350 or a component of the UE 350, such as the TX processor 368, the RX processor 356, and/or the controller/processor 359). The method may enable the UE to limit MCS and/or K1 offset used for communicating with a base station to a threshold based at least in part on an SCS used for the communication.

At 702, the UE may determine a subcarrier spacing for communication with a base station, such as described in connection with FIGS. 4 and 6. For example, at 406, the UE 402 may determine an SCS 408 for communicating with the base station 404. The determination of the subcarrier spacing may be performed, e.g., by the SCS determination component 840 of the apparatus 802 in FIG. 8.

At 704, the UE may determine to limit at least one of an MCS to less than or equal to an MCS threshold or a K1 offset to greater than or equal to a K1 offset threshold based on the determined subcarrier spacing, where the K1 offset may be a number of slots between receiving DL data and transmitting acknowledgment ACK/NACK feedback, such as described in connection with FIGS. 4 and 6. For example, at 412, the UE 402 may determine to limit an MCS to less than or equal to an MCS threshold 414 based on the determined SCS 408, or at 612, the UE may determine to limit a K1 offset between receiving DL data and transmitting ACK/NACK feedback to greater than or equal to a K1 offset threshold 614 based on the determined SCS 608. The determination of to limit the MCS and/or the K1 offset may be performed, e.g., by the MCS/K1 threshold component 842 of the apparatus 802 in FIG. 8.

At 706, if the UE determines to limit the MCS to less than or equal to the MCS threshold, the UE may transmit, to the base station, a capability message indicating a maximum MCS that the UE can support, where the maximum MCS may be the MCS threshold, such as described in connection with FIG. 4. For example, at 418, the UE 402 may transmit a capability message 420 that indicates a maximum MCS that the UE 402 may support. The transmission of the capability message may be performed, e.g., by the capability message component 844 and/or the transmission component 834 of the apparatus 802 in FIG. 8.

In one example, the capability message may further indicate an overhead parameter associated with the MCS. In such an example, the UE may determine the overhead parameter based on a PT-RS density received from the base station.

In one example, after transmitting the capability message, the UE may receive, from the base station, communication, where the scheduling may be based on the transmitted capability message.

In another example, the UE may determine that ICI when communicating with the base station is greater than a threshold, such that the determination to limit the MCS to less than or equal to the MCS threshold may be further based on the ICI being greater than the threshold.

At 708, if the UE determines to limit the K1 offset to greater than or equal to the K1 offset threshold, the UE may transmit, to the base station, a capability message indicating a minimum K1 offset that the UE can support, where the minimum K1 offset may be the K1 offset threshold, such as described in connection with FIG. 6. For example, at 618, the UE 602 may transmit a capability message 620 that indicates a minimum K1 offset that the UE can support. The transmission of the capability message may be performed, e.g., by the capability message component 844 and/or the transmission component 834 of the apparatus 802 in FIG. 8.

In one example, the UE may determine that ICI when communicating with the base station is greater than a threshold, such that the determination to limit the K1 offset to greater than or equal to the K1 offset threshold may be further based on the ICI being greater than the threshold.

At 710, the UE may communicate with the base station based at least on one of an MCS less than or equal to the determined MCS threshold or a K1 offset greater than or equal to the K1 offset threshold, such as described in connection with FIGS. 4 and 6. For example, at 422, the UE 402 may communicate with the base station 404 based on an MCS less than or equal to the determined MCS threshold 414, or at 622, the UE 602 may communicate with the base station 604 based on an K1 offset greater than or equal to the determined K1 offset threshold 614. The communication may be performed, e.g., by the communication component 846, the reception component 830 and/or the transmission component 834 of the apparatus 802 in FIG. 8.

Figure 8:
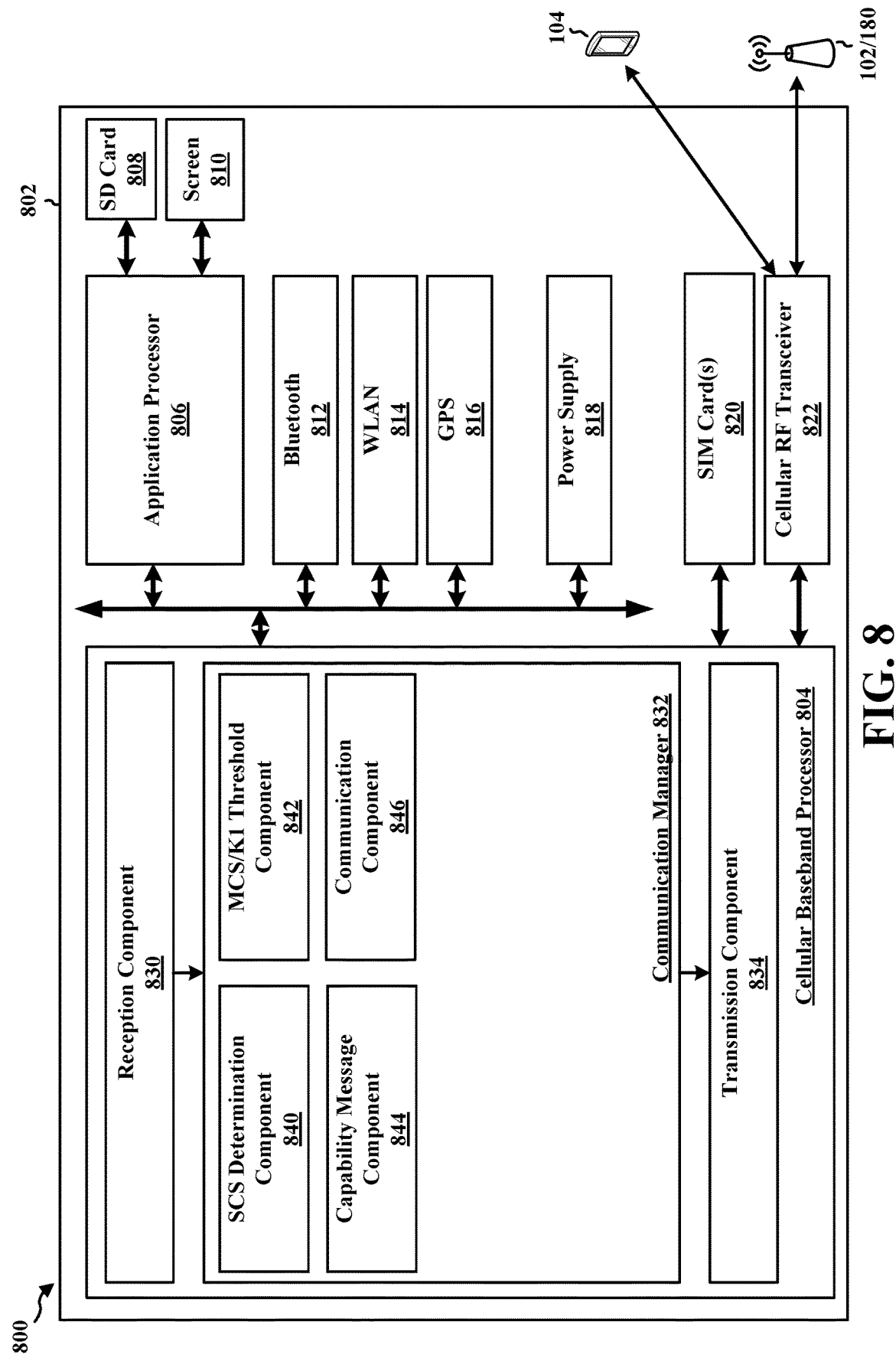
FIG. 8 is a diagram illustrating an example of a hardware implementation for an example apparatus in accordance with aspects presented herein.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/ memory. The computer-readable medium/memory may be non-transitory. The cellular baseband processor 804 is responsible for general processing, including the execution of software stored on the computer-readable medium/ memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 includes SCS determination component 840 that is configured to determine a subcarrier spacing for communication with a base station, e.g., as described in connection with 702 of FIG. 7. The communication manager 832 further includes an MCS/K1 threshold component 842 that is configured to determine to limit at least one of an MCS to less than or equal to a K1 offset threshold or a K1 offset to greater than or equal to a K1 offset threshold based on the determined subcarrier spacing, where the K1 offset is a number of slots between receiving DL data and transmitting acknowledgment ACK/NACK feedback, e.g., as described in connection with 704 of FIG. 7. The communication manager 832 further includes a capability message component 844 that is configured to transmitting, to the base station, a capability message indicating a maximum MCS that the UE can support, the maximum MCS being the MCS threshold and/or indicating a minimum K1 offset that the UE can support, the minimum K1 offset being the K1 offset threshold, e.g., as described in connection with 706 and/or 708 of FIG. 7. The communication manager 832 further includes a communication component 846 that is configured to communicate with the base station based at least on one of an MCS less than or equal to the determined MCS threshold or a K1 offset greater than or equal to the K1 offset threshold, e.g., as described in connection with 710 of FIG. 7.

The apparatus may include additional components that perform each of the blocks of the algorithm in the flowchart of FIG. 7. As such, each block in the flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining a subcarrier spacing for communication with a base station (e.g., the SCS determination component 840). The apparatus 802 includes means for determining to limit at least one of an MCS to less than or equal to an MCS threshold or a K1 offset to greater than or equal to a K1 offset threshold based on the determined subcarrier spacing, where the K1 offset is a number of slots between receiving DL data and transmitting acknowledgment ACK/NACK feedback (e.g., the MCS/K1 component 842). The apparatus 802 includes means for communicating with the base station based at least on one of an MCS less than or equal to the determined MCS threshold or a K1 offset greater than or equal to the K1 offset threshold (e.g., the communication component 846, the reception component 830 and/or the transmission component 834).

In one configuration, if the apparatus 802 determines to limit the MCS to less than or equal to the MCS threshold, the apparatus 802 may include means for transmitting, to the base station, a capability message indicating a maximum MCS that the apparatus 802 can support, where the maximum MCS may be the MCS threshold (e.g., the capability message component 844, and/or the transmission component 834). In such configuration, the capability message may further indicate an overhead parameter associated with the MCS. In such configuration, the apparatus 802 may determine the overhead parameter based on a PT-RS density received from the base station.

In one configuration, after transmitting the capability message, the apparatus 802 may receive, from the base station, communication, where the scheduling may be based on the transmitted capability message.

In one configuration, the apparatus 802 may include means for determining that ICI when communicating with the base station is greater than a threshold, such that the means for determining to limit the MCS to less than or equal to the MCS threshold may be further based on the ICI being greater than the threshold.

In one configuration, if the apparatus 802 determines to limit the K1 offset to greater than or equal to the K1 offset threshold, the apparatus 802 may include means for transmitting, to the base station, a capability message indicating a minimum K1 offset that the apparatus 802 can support, where the minimum K1 offset may be the K1 offset threshold (e.g., the capability message component 844, and/or the transmission component 834). In such configuration, the apparatus 802 may include means for determining that ICI when communicating with the base station is greater than a threshold, such that the determination to limit the K1 offset to greater than or equal to the K1 offset threshold may be further based on the ICI being greater than the threshold.

The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 9:
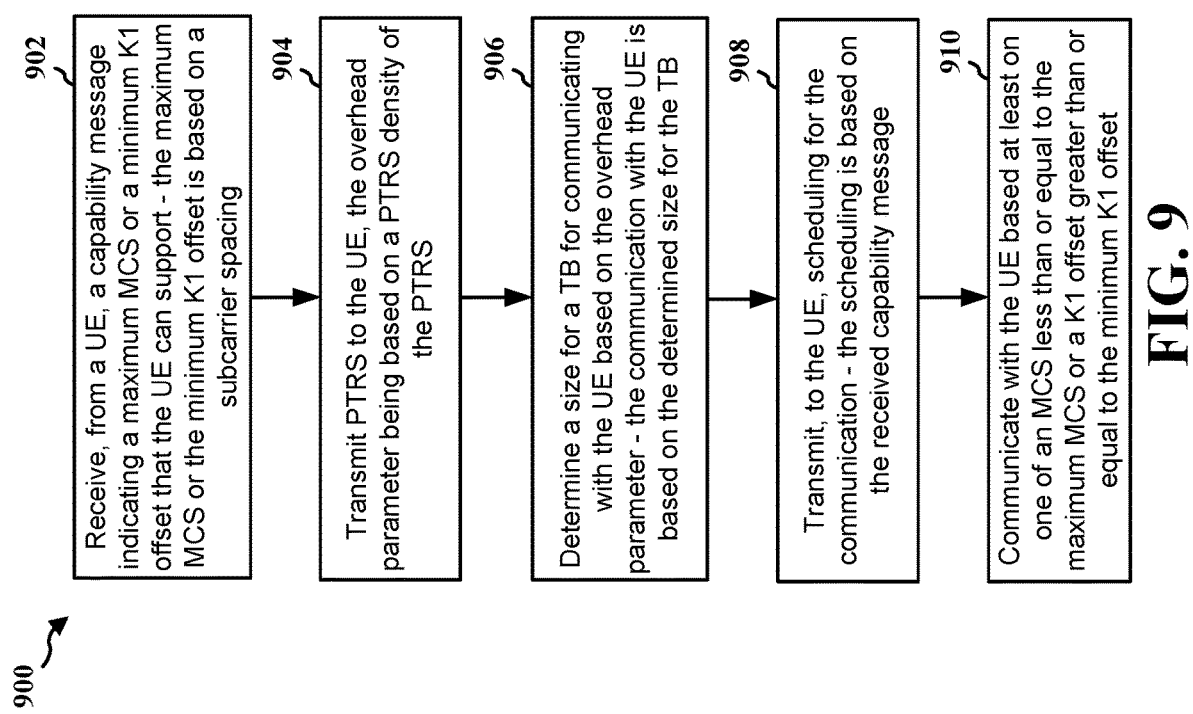
FIG. 9 is a flowchart of a method of wireless communication in accordance with aspects presented herein.

FIG. 9 is a flowchart 900 of a method of wireless communication. The method may be performed by a base station or a component of a base station (e.g., the base station 102, 180, 310, 404, 504, 604; the apparatus 1002; a processing system, which may include the memory 376 and which may be the entire base station 310 or a component of the base station 310, such as the TX processor 316 the RX processor 370, and/or the controller/processor 375). The method may enable the base station to communicate with a UE (e.g., the UE 104) based on an MCS and/or a K1 offset indicated or supported by the UE.

At 902, the base station may receive, from a UE, a capability message indicating a maximum MCS or a minimum K1 offset that the UE can support, the maximum MCS or the minimum K1 offset may be based on a subcarrier spacing, such as described in connection with FIGS. 4 and 6. For example, at 418, the base station 404 may receive a capability message 420 from the UE 402 that indicates a maximum MCS that the UE 402 may support, or at 618, the base station 604 may receive a capability message 620 from the UE 602 that indicates a minimum K1 offset that the UE can support. The reception of the capability message may be performed, e.g., by the capability message process component 1040 and/or the reception component 1030 of the apparatus 1002 in FIG. 10.

At 904, the base station may transmit PT-RS to the UE. In one example, the capability message may further indicate an overhead parameter associated with the maximum MCS, where the overhead parameter may be based on a PT-RS density of the PT-RS, such as described in connection with FIG. 4. The transmission of PT-RS may be performed, e.g., by the PT-RS component 1042 and/or the transmission component 1034 of the apparatus 1002 in FIG. 10.

At 906, the base station may determine a size for a TB for communicating with the UE based on the overhead parameter, where the communication with the UE may be based on the determined size for the TB, such as described in connection with FIG. 4. The determination of the size for the TB may be performed, e.g., by the TB size determination component 1044 of the apparatus 1002 in FIG. 10.

At 908, the base station may transmit, to the UE, scheduling for the communication, the scheduling may be based on the received capability message, such as described in connection with FIGS. 4 and 6. The transmission of the scheduling may be performed, e.g., by the transmission component 1034 of the apparatus 1002 in FIG. 10.

At 910, the base station may communicate with the UE based at least on one of an MCS less than or equal to the maximum MCS or a K1 offset greater than or equal to the minimum K1 offset, such as described in connection with FIGS. 4 and 6. For example, at 422, the base station 404 may communicate with the UE 402 based on an MCS less than or equal to the max MCS (e.g., the MCS threshold 414), or at 622, the base station 604 may communicate with the UE 602 based on an K1 offset greater than or equal to the minimum K1 offset (e.g., the K1 offset threshold 614). The communication may be performed, e.g., by the communication component 1046, the reception component 1030 and/or the transmission component 1034 of the apparatus 1002 in FIG. 10.

Figure 10:
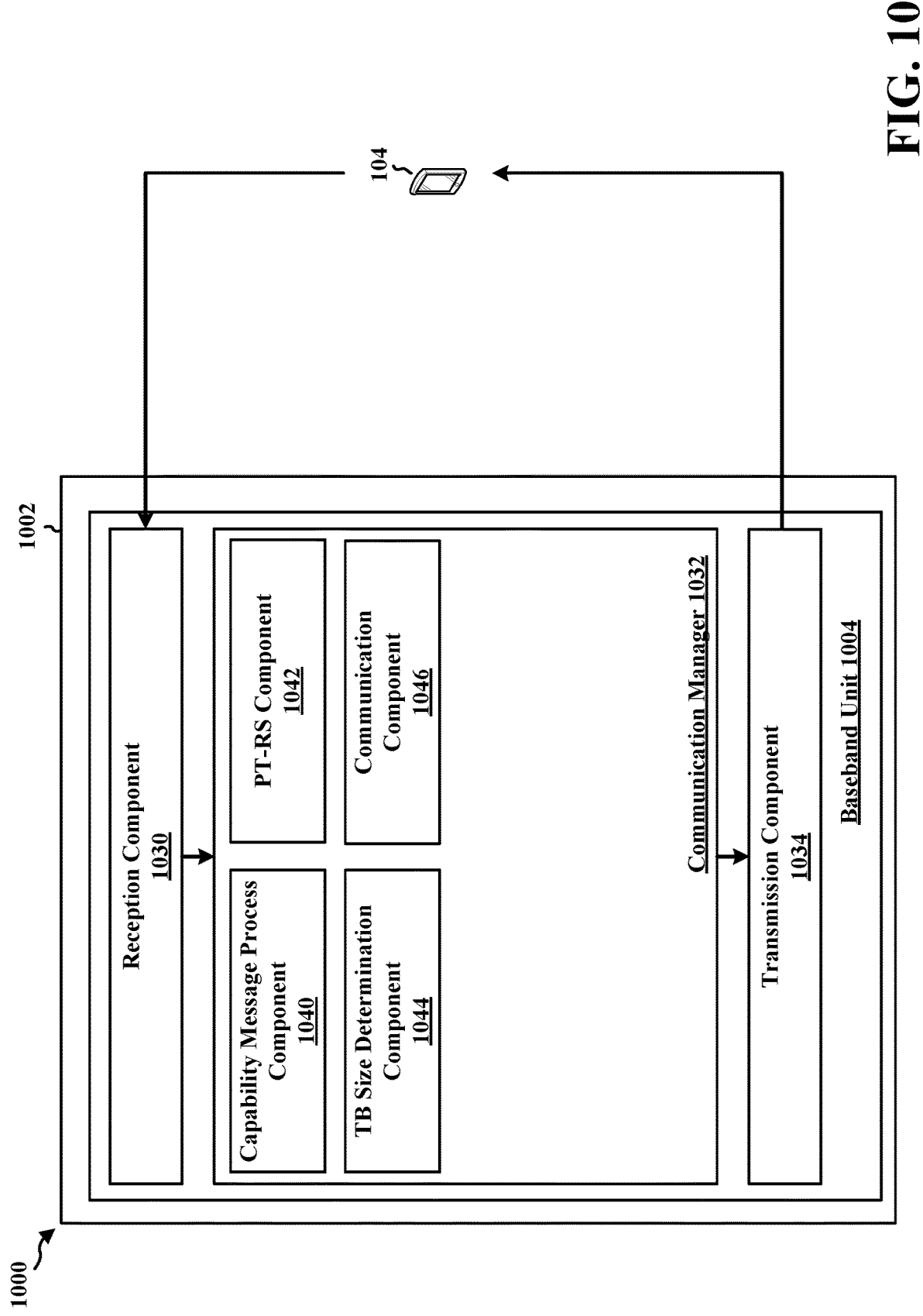
FIG. 10 is a diagram illustrating an example of a hardware implementation for an example apparatus in accordance with aspects presented herein.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a capability process component 1040 that is configured to receive, from a UE, a capability message indicating a maximum MCS or a minimum K1 offset that the UE can support, the maximum MCS or the minimum K1 offset being based on a subcarrier spacing, e.g., as described in connection with 902 of FIG. 9. The communication manager 1032 further includes a PT-RS component 1042 that is configured to transmit PT-RS to the UE, the overhead parameter being based on a PT-RS density of the PT-RS, e.g., as described in connection with 904 of FIG. 9. The communication manager 1032 further includes a TB size determination component 1044 that is configured to determine a size for a TB for communicating with the UE based on the overhead parameter, where the communication with the UE is based on the determined size for the TB, e.g., as described in connection with 906 of FIG. 9. The communication manager 1032 further includes a communication component 1046 that is configured to communicate with the UE based at least on one of an MCS less than or equal to the maximum MCS or a K1 offset greater than or equal to the minimum K1 offset, e.g., as described in connection with 910 of FIG. 9.

The apparatus may include additional components that perform each of the blocks of the algorithm in the flowchart of FIG. 9. As such, each block in the flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for receiving, from a UE, a capability message indicating a maximum MCS or a minimum K1 offset that the UE can support, the maximum MCS or the minimum K1 offset being based on a subcarrier spacing (e.g., the capability process component 1040 and/or the reception component 1030). The apparatus 1002 includes means for communicating with the UE based at least on one of an MCS less than or equal to the maximum MCS or a K1 offset greater than or equal to the minimum K1 offset (e.g., the communication component 1046, the reception component 1030 and/or the transmission component 1034).

In one configuration, the capability message further indicates an overhead parameter associated with the maximum MCS. In such a configuration, the apparatus 1002 includes means for determining a size for a TB for communicating with the UE based on the overhead parameter, where the communication with the UE is based on the determined size for the TB (e.g., the TB size determination component 1044 and/or the communication component 1046). In such a configuration, the apparatus 1002 includes means for transmitting PT-RS to the UE, the overhead parameter being based on a PT-RS density of the PT-RS (e.g., the transmission component 1034).

In another configuration, the apparatus 1002 includes means for transmitting, to the UE, scheduling for the communication, the scheduling being based on the received capability message (e.g., the transmission component 1034).

The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 11:
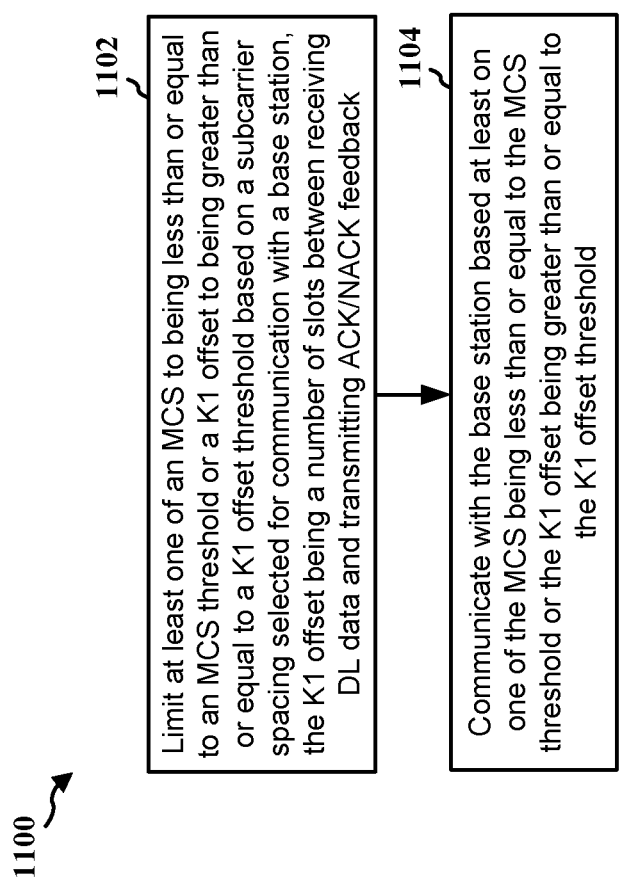
FIG. 11 is a flowchart of a method of wireless communication in accordance with aspects presented herein.

FIG. 11 is a flowchart 1100 of a method of wireless communication. The method may be performed by a UE or a component of a UE (e.g., the UE 104, 350, 402, 502, 602; the apparatus 1202; a processing system, which may include the memory 360 and which may be the entire UE 350 or a component of the UE 350, such as the TX processor 368, the RX processor 356, and/or the controller/processor 359). The method may enable the UE to limit MCS and/or K1 offset used for communicating with a base station to a threshold based at least in part on an SCS used for the communication.

At 1102, the UE may limit at least one of an MCS to being less than or equal to an MCS threshold or a K1 offset to being greater than or equal to a K1 offset threshold based on a subcarrier spacing selected for communication with a base station, the K1 offset being a number of slots between receiving DL data and transmitting ACK/NACK feedback, such as described in connection with FIGS. 4 and 6. For example, at 412, the UE 402 may limit an MCS to less than or equal to an MCS threshold 414 based on the SCS 408, or at 612, the UE may determine to limit a K1 offset between receiving DL data and transmitting ACK/NACK feedback to greater than or equal to a K1 offset threshold 614 based on the SCS 608. The limitation of the MCS and/or the K1 offset may be performed, e.g., by the MCS/K1 limit component 1240 of the apparatus 1202 in FIG. 12.

In one example, if the UE limits the MCS to less than or equal to the MCS threshold, the UE may transmit, to the base station, a capability message indicating a maximum MCS that the UE can support, where the maximum MCS may be the MCS threshold, such as described in connection with FIG. 4. For example, at 418, the UE 402 may transmit a capability message 420 that indicates a maximum MCS that the UE 402 may support.

In another example, the capability message may further indicate an overhead parameter associated with the MCS. In such an example, the UE may determine the overhead parameter based on a PT-RS density received from the base station.

In another example, after transmitting the capability message, the UE may receive, from the base station, communication, where the scheduling may be based on the transmitted capability message.

In another example, the UE may measure ICI when communicating with the base station, such that the limitation of the MCS to less than or equal to the MCS threshold may be further based on the ICI being greater than an ICI threshold.

In another example, if the UE limits the K1 offset to greater than or equal to the K1 offset threshold, the UE may transmit, to the base station, a capability message indicating a minimum K1 offset that the UE can support, where the minimum K1 offset may be the K1 offset threshold, such as described in connection with FIG. 6. For example, at 618, the UE 602 may transmit a capability message 620 that indicates a minimum K1 offset that the UE can support.

In another example, the UE may measure ICI when communicating with the base station, such that the limitation of the K1 offset to greater than or equal to the K1 offset threshold may be further based on the ICI being greater than the threshold.

At 1104, the UE may communicate with the base station based at least on one of the MCS being less than or equal to the MCS threshold or the K1 offset being greater than or equal to the K1 offset threshold, such as described in connection with FIGS. 4 and 6. For example, at 422, the UE 402 may communicate with the base station 404 based on an MCS less than or equal to the MCS threshold 414, or at 622, the UE 602 may communicate with the base station 604 based on an K1 offset greater than or equal to the K1 offset threshold 614. The communication may be performed, e.g., by the communication configuration component 1242, the reception component 1230 and/or the transmission component 1234 of the apparatus 1202 in FIG. 12.

Figure 12:
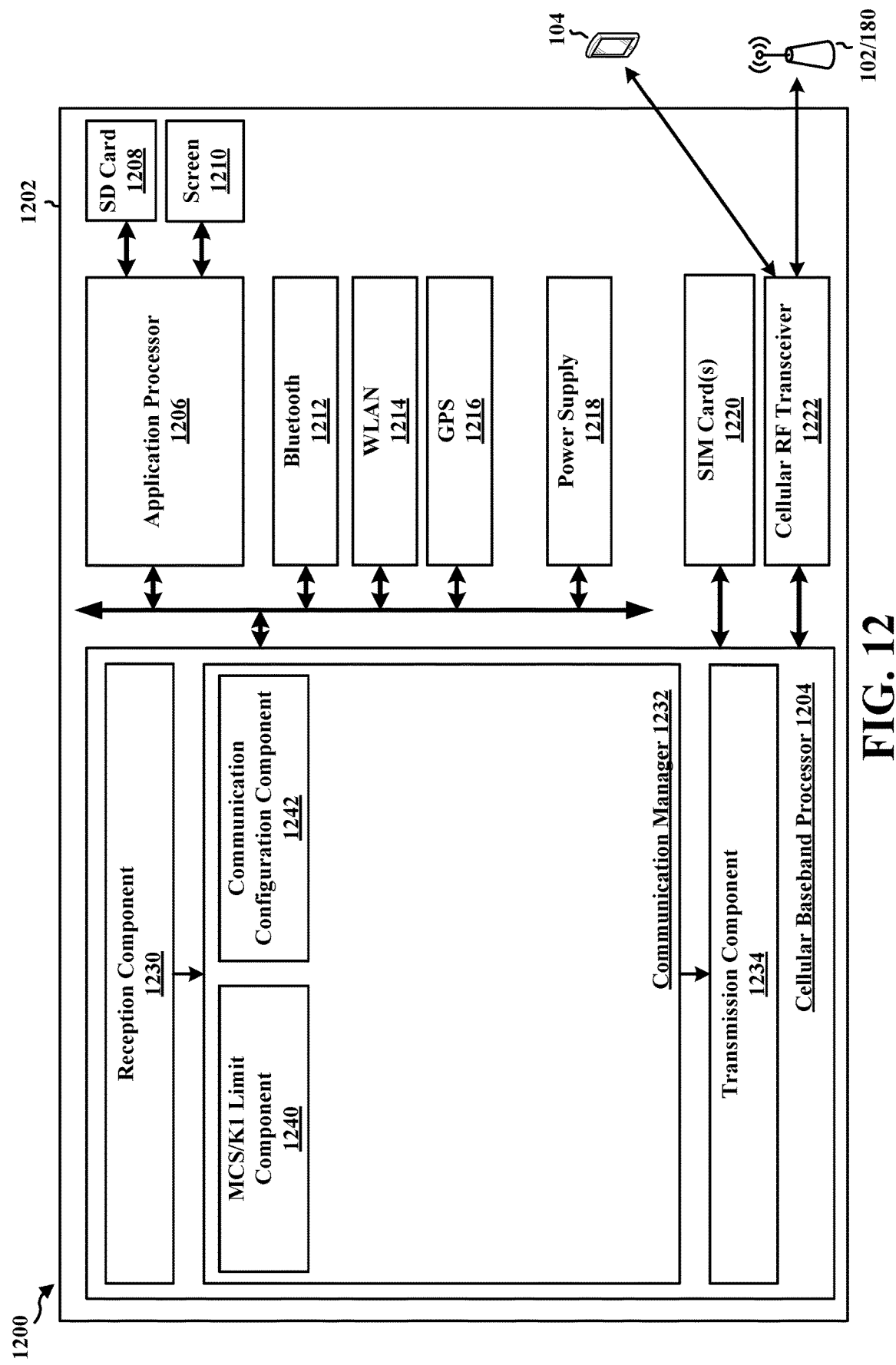
FIG. 12 is a diagram illustrating an example of a hardware implementation for an example apparatus in accordance with aspects presented herein.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 further includes an MCS/K1 threshold limit component 1240 that is configured to limit at least one of an MCS to less than or equal to an MCS threshold or a K1 offset to greater than or equal to a K1 offset threshold based on a subcarrier spacing selected for communication with a base station, where the K1 offset is a number of slots between receiving DL data and transmitting ACK/NACK feedback, e.g., as described in connection with 1102 of FIG. 11. The communication manager 1232 further includes a communication configuration component 1242 that is configured to communicate with the base station based at least on one of an MCS less than or equal to the determined MCS threshold or a K1 offset greater than or equal to the K1 offset threshold, e.g., as described in connection with 1104 of FIG. 11.

The apparatus may include additional components that perform each of the blocks of the algorithm in the flowchart of FIG. 11. As such, each block in the flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for limiting at least one of an MCS to less than or equal to an MCS threshold or a K1 offset to greater than or equal to a K1 offset threshold based on a subcarrier spacing selected for communication with a base station, where the K1 offset is a number of slots between receiving DL data and transmitting ACK/NACK feedback (e.g., the MCS/K1 limit component 1240). The apparatus 1202 includes means for communicating with the base station based at least on one of an MCS less than or equal to the MCS threshold or a K1 offset greater than or equal to the K1 offset threshold (e.g., the communication configuration component 1242, the reception component 1230, and/or the transmission component 1234).

In one configuration, if the apparatus 1202 includes means for limiting the MCS to less than or equal to the MCS threshold, the apparatus 1202 may include means for transmitting, to the base station, a capability message indicating a maximum MCS that the apparatus 1202 can support, where the maximum MCS may be the MCS threshold (e.g., the capability message component 1244, and/or the transmission component 1234). In such configuration, the capability message may further indicate an overhead parameter associated with the MCS. In such configuration, the apparatus 1202 may determine the overhead parameter based on a PT-RS density received from the base station.

In one configuration, after transmitting the capability message, the apparatus 1202 may receive, from the base station, communication, where the scheduling may be based on the transmitted capability message.

In one configuration, the apparatus 1202 may include means for measuring ICI when communicating with the base station, such that the means for determining to limit the MCS to less than or equal to the MCS threshold may be further based on the ICI being greater than the threshold.

In one configuration, if the apparatus 1202 includes means for limiting the K1 offset to greater than or equal to the K1 offset threshold, the apparatus 1202 may include means for transmitting, to the base station, a capability message indicating a minimum K1 offset that the apparatus 1202 can support, where the minimum K1 offset may be the K1 offset threshold (e.g., the capability message component 1244, and/or the transmission component 1234). In such configuration, the apparatus 1202 may include means for determining that ICI when communicating with the base station is greater than a threshold, such that the determination to limit the K1 offset to greater than or equal to the K1 offset threshold may be further based on the ICI being greater than the threshold.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

The following examples set forth additional aspects and are illustrative only and aspects thereof may be combined with aspects of other embodiments or teaching described herein, without limitation.

Aspect 1 is a method of wireless communication of a UE, including: determining a subcarrier spacing for communication with a base station; determining to limit at least one of an MCS to less than or equal to an MCS threshold or a K1 offset to greater than or equal to a K1 offset threshold based on the determined subcarrier spacing, where the K1 offset is a number of slots between receiving DL data and transmitting acknowledgment ACK/NACK feedback; and communicating with the base station based at least on one of an MCS less than or equal to the determined MCS threshold or a K1 offset greater than or equal to the K1 offset threshold.

In aspect 2, the method of aspect 1 further includes that the determining to limit the at least one of the MCS to less than or equal to the MCS threshold or the K1 offset to greater than or equal to the K1 offset threshold includes determining to limit the MCS to less than or equal to the MCS threshold.

In aspect 3, the method of aspect 1 or aspect 2 further includes determining that ICI when communicating with the base station is greater than a threshold, where the determination to limit the MCS to less than or equal to the MCS threshold is further based on the ICI being greater than the threshold.

In aspect 4, the method of any of aspects 1-3 further includes transmitting, to the base station, a capability message indicating a maximum MCS that the UE can support, the maximum MCS being the MCS threshold.

In aspect 5, the method of any of aspects 1-4 further includes that the capability message further indicates an overhead parameter associated with the MCS.

In aspect 6, the method of any of aspects 1-5 further includes determining the overhead parameter based on a PT-RS density received from the base station.

In aspect 7, the method of any of aspects 1-6 further includes receiving, from the base station, communication, the scheduling being based on the transmitted capability message.

In aspect 8, the method of any of aspects 1-7 further includes that the determining to limit the at least one of the MCS to less than or equal to the MCS threshold or the K1 offset to greater than or equal to the K1 offset threshold includes determining to limit the K1 offset to greater than or equal to the K1 offset threshold.

In aspect 9, the method of any of aspects 1-8 further includes determining that ICI when communicating with the base station is greater than a threshold, where the determination to limit the K1 offset to greater than or equal to the K1 offset threshold is further based on the ICI being greater than the threshold.

In aspect 10, the method of any of aspects 1-9 further includes transmitting, to the base station, a capability message indicating a minimum K1 offset that the UE can support, the minimum K1 offset being the K1 offset threshold.

Aspect 11 is an apparatus for wireless communication including at least one processor coupled to a memory and configured to implement a method as in any of aspects 1 to 10.

Aspect 12 is an apparatus for wireless communication including means for implementing a method as in any of aspects 1 to 10.

Aspect 13 is a non-transitory computer-readable medium storing computer executable code, where the code when executed by a processor causes the processor to implement a method as in any of aspects 1 to 10.

Aspect 14 is a method of wireless communication of a base station, including: receiving, from a UE, a capability message indicating a maximum MCS or a minimum K1 offset that the UE can support, the maximum MCS or the minimum K1 offset being based on a subcarrier spacing; and communicating with the UE based at least on one of an MCS less than or equal to the maximum MCS or a K1 offset greater than or equal to the minimum K1 offset.

In aspect 15, the method of aspect 14 further includes that the capability message further indicates an overhead parameter associated with the maximum MCS.

In aspect 16, the method of aspect 14 or aspect 15 further includes determining a size for a TB for communicating with the UE based on the overhead parameter, where the communication with the UE is based on the determined size for the TB.

In aspect 17, the method of any of aspects 14-16 further includes transmitting PT-RS to the UE, the overhead parameter being based on a PT-RS density of the PT-RS.

In aspect 18, the method of any of aspects 14-17 further includes transmitting, to the UE, scheduling for the communication, the scheduling being based on the received capability message.

Aspect 19 is an apparatus for wireless communication including at least one processor coupled to a memory and configured to implement a method as in any of aspects 14 to 18.

Aspect 20 is an apparatus for wireless communication including means for implementing a method as in any of aspects 14 to 18.

Aspect 21 is a non-transitory computer-readable medium storing computer executable code, where the code when executed by a processor causes the processor to implement a method as in any of aspects 14 to 18.

Aspect 22 is an apparatus for wireless communication including at least one processor coupled to a memory and configured to: limit at least one of an MCS to being less than or equal to an MCS threshold or a K1 offset to being greater than or equal to a K1 offset threshold based on a subcarrier spacing selected for communication with a base station, the K1 offset being a number of slots between receiving DL data and transmitting ACK/NACK feedback; and communicate with the base station based at least on one of an MCS less than or equal to the MCS threshold or a K1 offset greater than or equal to the K1 offset threshold.

Aspect 23 is the apparatus of aspect 22, where to limit the at least one of the MCS to less than or equal to the MCS threshold or the K1 offset to greater than or equal to the K1 offset threshold, the at least one processor and the memory are further configured to: limit the MCS to less than or equal to the MCS threshold.

Aspect 24 is the apparatus of any of aspects 22 and 23, where the at least one processor and the memory are further configured to: measure ICI when communicating with the base station, where to limit the MCS to less than or equal to the MCS threshold is further based on the ICI being greater than an ICI threshold.

Aspect 25 is the apparatus of any of aspects 22 to 24, where the at least one processor and the memory are further configured to: transmit, to the base station, a capability message indicating a maximum MCS that the UE can support, the maximum MCS being the MCS threshold.

Aspect 26 is the apparatus of any of aspects 22 to 25, where the capability message further indicates an overhead parameter associated with the MCS.

Aspect 27 is the apparatus of any of aspects 22 to 26, where the at least one processor and the memory are further configured to: select the overhead parameter based on a PT-RS density received from the base station.

Aspect 28 is the apparatus of any of aspects 22 to 27, where the at least one processor and the memory are further configured to: receive, from the base station, scheduling for the communication, the scheduling being based on the transmitted capability message.

Aspect 29 is the apparatus of any of aspects 22 to 28, where to limit the at least one of the MCS to less than or equal to the MCS threshold or the K1 offset to greater than or equal to the K1 offset threshold, the at least one processor and the memory are further configured to: limit the K1 offset to greater than or equal to the K1 offset threshold.

Aspect 30 is the apparatus of any of aspects 22 to 29, where the at least one processor and the memory are further configured to: measure ICI when communicating with the base station, where to limit the K1 offset to greater than or equal to the K1 offset threshold is further based on the ICI being greater than an ICI threshold.

Aspect 31 is the apparatus of any of aspects 22 to 30, where the at least one processor and the memory are further configured to: transmit, to the base station, a capability message indicating a minimum K1 offset that the UE can support, the minimum K1 offset being the K1 offset threshold.

Aspect 32 is a method of wireless communication for implementing any of aspects 22 to 31.

Aspect 33 is an apparatus for wireless communication including means for implementing any of aspects 22 to 31.

Aspect 34 is a computer-readable medium storing computer executable code, where the code when executed by a processor causes the processor to implement any of aspects 22 to 31.

Aspect 35 is an apparatus for wireless communication including at least one processor coupled to a memory and configured to receive, from a UE, a capability message indicating an MCS or a minimum K1 offset that the UE can support, the maximum MCS or the minimum K1 offset being based on a subcarrier spacing; and communicate with the UE based at least on one of an MCS less than or equal to the maximum MCS or a K1 offset greater than or equal to the minimum K1 offset.

Aspect 36 is the apparatus of aspect 35, where the capability message further indicates an overhead parameter associated with the maximum MCS.

Aspect 37 is the apparatus of any of aspects 35 and 36, where the at least one processor and the memory are further configured to select a size for a TB for communicating with the UE based on the overhead parameter, where the communication with the UE is based on the size for the TB.

Aspect 38 is the apparatus of any of aspects 35 to 37, where the at least one processor and the memory are further configured to transmit PT-RS to the UE, the overhead parameter being based on a PT-RS density of the PT-RS.

Aspect 39 is the apparatus of any of aspects 35 to 38, where the at least one processor and the memory are further configured to transmit, to the UE, scheduling for the communication, the scheduling being based on the received capability message.

Aspect 40 is a method of wireless communication for implementing any of aspects 35 to 39.

Aspect 41 is an apparatus for wireless communication including means for implementing any of aspects 35 to 39.

Aspect 42 is a computer-readable medium storing computer executable code, where the code when executed by a processor causes the processor to implement any of aspects 35 to 39.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus of wireless communication at a user equipment (UE), comprising:
    a memory; and
    at least one processor coupled to the memory and configured to:
        limit a modulation and coding scheme (MCS) for a communication with a base station to less than or equal to 16-quadrature amplitude modulation (16-QAM) when a communication frequency for the communication is above 52.6 GHz and a subcarrier spacing selected for the communication is 120 KHz or below;
        transmit, to the base station, a capability message indicating a maximum MCS that the UE can support is the 16-QAM when the communication is above the 52.6 GHz and the subcarrier spacing selected for the communication is the 120 KHz or below; and
        communicate with the base station using the MCS that is less than or equal to the 16-QAM when the communication is above the 52.6 GHz and the subcarrier spacing selected for the communication is the 120 KHz or below.

2. The apparatus of claim 1, wherein the at least one processor and the memory are further configured to:
    measure inter-carrier interference (ICI) when communicating with the base station, wherein limitation of the MCS to less than or equal to the 16-QAM is further based on the ICI being greater than an ICI threshold.

3. The apparatus of claim 1, wherein the capability message further indicates an overhead parameter associated with the MCS.

4. The apparatus of claim 3, wherein the at least one processor and the memory are further configured to:
    select the overhead parameter based on a phase tracking reference signal (PT-RS) density.

5. The apparatus of claim 3, wherein the at least one processor and the memory are further configured to:
    select the overhead parameter based on a used MCS.

6. The apparatus of claim 3, wherein the at least one processor and the memory are further configured to:

select the overhead parameter based on a physical resource block (PRB) allocation associated with the communication.

7. The apparatus of claim 1, wherein the at least one processor and the memory are further configured to:
receive, from the base station, scheduling for the communication, the scheduling being based on the capability message.

8. A method of wireless communication of at user equipment (UE), comprising:
limiting a modulation and coding scheme (MCS) for a communication with a base station to less than or equal to 16-quadrature amplitude modulation (16-QAM) when a communication frequency for the communication is above 52.6 GHz and a subcarrier spacing selected for the communication is 120 KHz or below;
transmitting, to the base station, a capability message indicating a maximum MCS that the UE can support is the 16-QAM when the communication is above the 52.6 GHz and the subcarrier spacing selected for the communication is the 120 KHz or below; and
communicating with the base station using the MCS that is less than or equal to the 16-QAM when the communication is above the 52.6 GHz and the subcarrier spacing selected for the communication is the 120 KHz or below.

9. The method of claim 8, further comprising measuring inter-carrier interference (ICI) when communicating with the base station, wherein limitation of the MCS to less than or equal to the 16-QAM is further based on the ICI being greater than an ICI threshold.

10. The method of claim 8, wherein the capability message further indicates an overhead parameter associated with the MCS.

11. The method of claim 10, further comprising:
selecting the overhead parameter based on a phase tracking reference signal (PT-RS) density.

12. The method of claim 10, further comprising:
selecting the overhead parameter based on a used MCS.

13. The method of claim 10, further comprising:
selecting the overhead parameter based on a physical resource block (PRB) allocation associated with the communication.

14. The method of claim 8, further comprising:
receiving, from the base station, scheduling for the communication, the scheduling being based on the capability message.

15. An apparatus for wireless communication at a base station, comprising:
a memory; and
at least one processor coupled to the memory and configured to:
receive, from a user equipment (UE), a capability message indicating a maximum modulation and coding scheme (MCS) that the UE can support is 16-quadrature amplitude modulation (16-QAM) when communicating above 52.6 GHz and a subcarrier spacing selected for the communication is 120 KHz or below; and
communicate with the UE using an MCS being that is less than or equal to the 16-QAM when the communication is above the 52.6 GHZ and the subcarrier spacing selected for the communication is the 120 KHz or below.

16. The apparatus of claim 15, wherein the capability message further indicates an overhead parameter associated with the maximum MCS.

17. The apparatus of claim 16, wherein the at least one processor and the memory are further configured to select a size for a transport block (TB) for communicating with the UE based on the overhead parameter, wherein the communication with the UE is based on the size for the TB.

18. The apparatus of claim 16, wherein the at least one processor and the memory are further configured to transmit phase tracking reference signal (PT-RS) to the UE, the overhead parameter being based on a PT-RS density of the PT-RS.

19. The apparatus of claim 16, wherein the at least one processor and the memory are further configured to transmit, to the UE, scheduling for the communication, the scheduling being based on the received capability message.

20. A method of wireless communication at a base station, comprising:
receiving, from a user equipment (UE), a capability message indicating a maximum modulation and coding scheme (MCS) that the UE can support is 16-quadrature amplitude modulation (16-QAM) when communicating above 52.6 GHz and a subcarrier spacing selected for the communication is 120 KHz or below; and
communicating with the UE using an MCS that is less than or equal to the 16-QAM when the communication is above the 52.6 GHz and the subcarrier spacing selected for the communication is the 120 KHz or below.

21. The method of claim 20, wherein the capability message further indicates an overhead parameter associated with the maximum MCS.

22. The method of claim 21, further comprising selecting a size for a transport block (TB) for communicating with the UE based on the overhead parameter, wherein the communication with the UE is based on the size for the TB.

23. The method of claim 21, further comprising transmitting phase tracking reference signal (PT-RS) to the UE, the overhead parameter being based on a PT-RS density of the PT-RS.

24. The method of claim 21, further comprising transmitting, to the UE, scheduling for the communication, the scheduling being based on the received capability message.

* * * * *